United States Patent Office 3,268,278
Patented August 23, 1966

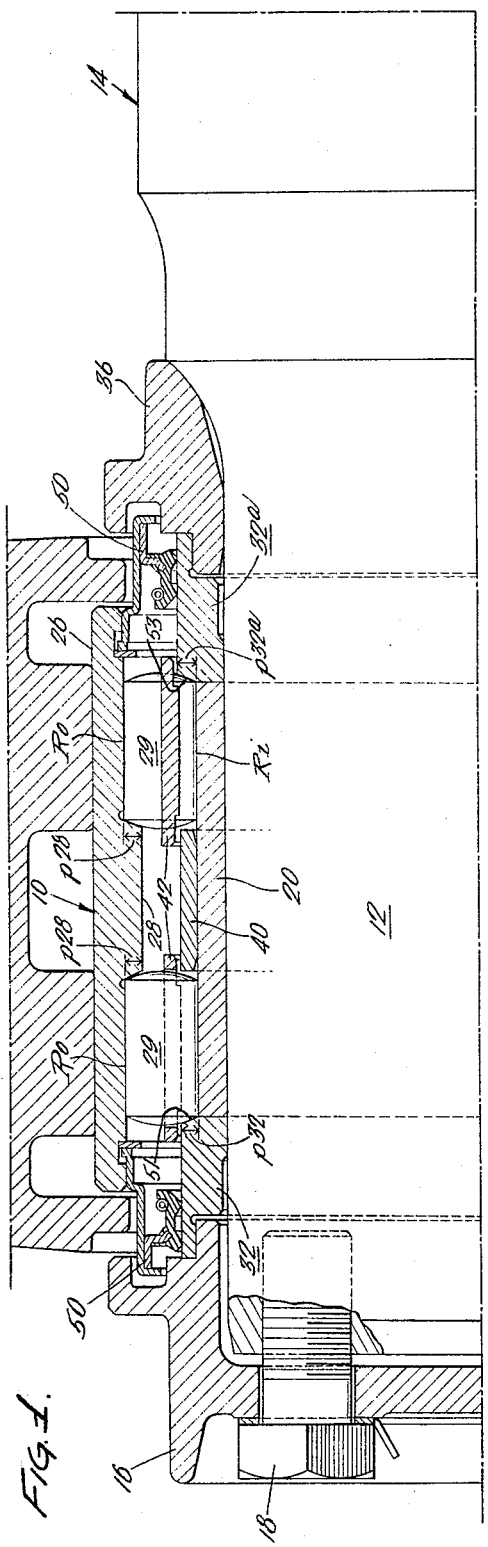

3,268,278
ROLLING BEARINGS
Glenn T. Purdy, Wayne, Pa., assignor to SKF Industries, Inc., King of Prussia, Pa., a corporation of Delaware
Filed June 17, 1964, Ser. No. 375,788
4 Claims. (Cl. 308—187)

This invention relates to improvements in rolling bearings and more particularly to improvements in cylindrical rolling bearing assemblies.

The cylindrical rolling bearing assembly of the present invention is especially adapted for use on a railway car truck journal. Heretofore in these applications, tapered rolling bearing assemblies were used wherein conventionally the inner and outer raceways are disposed at an angle to the rotational axis of the bearing so that the rollers are supported therebetween at an angle relative to the rotational axis of the bearing. These tapered rolling bearing assemblies are typically used in applications where the bearing assembly is subjected to radial load as well as axial loads. In these applications it would be desirable to use cylindrical roller bearing assemblies which characteristically have a greater capacity for taking radial load in comparison with tapered roller bearing assemblies of substantially the same size. However, prior cylindrical roller bearing assemblies have a limited capacity for taking axial load and it has been found that in some instances when these cylindrical roller bearing assemblies are used in applications to take comparatively large axial loads, the bearing assemblies are prone to surface distress such as smearing, welding, pulling or scuffing on the thrust flange and the roller end faces.

The cylindrical rolling bearing assembly of the present invention is characterized by novel features of construction and arrangement whereby the bearing assembly is able effectively to withstand radial loads as well as axial loads and hence may be used effectively in applications where it is subjected to radial and axial loads such as in railway car truck journals. It has been found that cylindrical roller bearings constructed in accordance with the present invention can withstand axial loading up to 40 percent of its rated radial load capacity which is a substantially greater capacity for axial loads than conventional cylindrical roller bearings heretofore known. Among the advantages of using a cylindrical roller bearing in lieu of a tapered roller bearing is the fact that the cylindrical roller bearing has a greater radial load capacity and with the improved design of the present invention, the cylindrical roller bearing has a capacity for axial loads substantially equal to that of comparable size tapered roller bearings.

In accordance with the present invention, the roller bearing assembly includes flanges having tapered load bearing surfaces confronting the roller axial end faces and with which the axial end faces of the rollers engage and rollers having sphered axial end faces which engage the tapered load bearing surfaces of the flanges. These load-bearing flanges may be formed integrally with the inner and/or outer rings or may be separate elements adjacent the inner and/or outer rings which cooperate with the rollers. More specifically, it has been found that the assembly has optimum load-bearing capacity as well as other functional advantages noted hereafter when the bearing assembly is characterized by a specific relationship of the elements thereof.

More specifically, it has been found that for a particular bearing configuration, optimum radial and axial load-bearing characteristics and fatigue life are provided by a particular bearing configuration wherein the annular load-bearing surfaces are tapered outwardly at an angle $\theta$ relative to a plane P which is transverse to the rotational axis of the rollers, the angle $\theta$ being approximately equal to the following equation:

$$\theta° = 1.73 L^{0.778} Z^{-0.25} D^{-0.93}$$

where L is the length of the roller, Z is the number of roller and D is the roller diameter and wherein the radius R of the sphered end face of the roller is approximately equal to the ratio of 0.417D to the sin $\theta$ and wherein the radial dimension $h$ of the load-bearing flange is at least equal to 0.25D.

By this specific arrangement it has been found that the bearing assembly can withstand axial loading up to 40 percent of its rated radial load capacity which is substantially more than heretofore known cylindrical bearings.

Further, by this arrangement the relationship of the load-bearing flange angle of taper and the radius of the sphered axial end face of the rollers is such that the tendency of the rollers to misalign or skew is minimized thereby reducing the function in the cage in this respect. Moreover it has been found that under load, a semi-elliptical area of contact exists between the sphered axial end faces of the rollers and the tapered load-bearing flange at a point on the flange approximately two-thirds below the terminal edge thereof.

Thus the roller contact with the load-bearing surface of the flange is adjacent the base of the flange thereby substantially reducing rubbing velocity and thereby providing low friction in the overall operation. In this regard, it is noted that friction is reduced under all rolling velocities, thereby resulting in reduced heat generated and thus there is reduced demand on lubricant and a significant reduction in the tendency of the roller end face and flange load bearing surface to weld, smear, pull or scuff.

Furthermore, it has been found that in bearing assemblies constructed in accordance with the present invention there is less tendency for the inner or outer ring to turn or "creep" where the inner ring is press fitted, for example, on a shaft and the outer ring is installed in a housing. This is a result of reduced frictional moments and a significantly reduced tendency of the roller to mechanically lock between the load-bearing surface of the flanges due to misalignment of the inner ring relative to the outer ring and the resultant roller misalignment or skewing.

Further by constructing a cylindrical roller bearing in accordance with the present invention, the area of contact between the roller end faces and the flange is below the terminal edge of the flange even under maximum conditions of roller skewing thereby preventing the flange from cutting into the sphered roller end face. Moreover the contact area between the sphered end face of the roller and the tapered load-bearing surface of the flange results in a significant increase in oil film thickness by presenting controlled contact surfaces which greatly enhance hydrodynamic oil film establishment. More particularly, there is close conformity of the sphere to the flange which wedges the lubricant and insures better hydrodynamic action of lubricant. Thus the contact friction is significantly reduced thereby reducing the tendency of the rollers to skew or twist as a result of frictional contact between the roller end face and the load-bearing surface of the flange.

These and other objectives of the present invention and the various specific details of the construction of a bearing assembly in accordance with the present invention are hereafter more fully set forth with reference to the accompanying drawings, in which:

FIG. 1 is a fragmentary sectional view of a railway truck journal on which is mounted a double row cylindrical roller bearing constructed in accordance with the present invention;

FIG. 2 is a fragmentary sectional view similar to FIG.

1 of a modified double row cylindrical roller bearing in accordance with the present invention providing a degree of axial movement; and FIG. 3 is an enlarged fragmentary view of a roller and the tapered load-bearing flange of a bearing assembly.

Referring now to the drawing and particularly to FIG. 1 thereof, there is illustrated a rolling bearing assembly 10 in accordance with the present invention mounted on the trunnion-like journal 12 of the axle 14 of a railway car truck journal. The rolling bearing assembly encloses the entire journal 12 and is tightly clamped thereto by means of an end cap 16 and bolts 18. The rolling bearing assembly illustrated is a double row cylindrical roller bearing; however it is to be understood that the present invention has application to other types of bearings for use in other applications.

The bearing assembly 10 comprises an inner ring 20, the outer surface of which defines the inner raceway $R_i$, and an outer ring 26 having a central built up portion or annular circumferentially extending rib 28 separating the pair of outer raceways $R_0$ and a plurality of rollers 29 in the space between the rings arranged in two side by side rows. In the present instance, a pair of collars 32, 32a is mounted at opposite ends of the inner ring 20, the collar 32 being disposed between the outer end of the ring 20 and the cap 16 and the collar 32a being disposed between the inner end of the ring 20 and a guard ring 36 press fitted on the inner end of the journal 12. The bearing assembly further includes a spacer ring 40 disposed between the rows of rollers and a cage 42 to circumferentially space the rollers in each of the rows. There is further provided lubricant sealing devices generally indicated by the numeral 50 at opposite axial ends of the bearing assembly. The collars 32, 32a are of a greater radial thickness than the inner ring so that they project upwardly beyond the inner raceway $R_i$ to provide an annular load-bearing surface against which the axial end faces of the rollers engage.

In accordance with the present invention, the bearing assembly is characterized by novel features of construction and arrangement whereby the bearing assembly is able to withstand effectively radial and axial loads. More specifically it has been found that for a particular bearing configuration, optimum radial and axial load-bearing characteristics and fatigue life are provided by a particular bearing configuration wherein the annular load-bearing surfaces are tapered outwardly at an angle $\theta$ relative to a plane P which is transverse to the rotational axis of the rollers, the angle $\theta$ being approximately equal to the following equation:

$$\theta° = 1.73 L^{0.778} Z^{-0.25} D^{-0.93}$$

where L is the length of the roller, Z is the number of rollers and D is the roller diameter and wherein the radius R of the sphered end face of the roller is approximately equal to the ratio of 0.417D to the sin $\theta$ and wherein the radial dimension $h$ of the load-bearing flange is at least equal to 0.25D. (See FIG. 3.) In the particular bearing assembly illustrated in FIG. 1, the side faces of the rib 28 are tapered and serve as the load-bearing surfaces against which the rollers abut at their inner axial end faces and the projecting portions of the collars 32, 32a are tapered as at 51 and 53 respectively to provide the load-bearing surfaces against which the outer axial end faces of the rollers abut. Further, the radial projection p28 of the rib 28 beyond the outer raceway $R_o$ is preferably approximately equal to 0.25D and the radial projections p32 and p32a of the collars 32 and 32a beyond the inner raceway $R_i$ is preferably approximately equal to 0.25D. By this arrangement the rollers contact the load-bearing surfaces at an area approximately two-thirds the distance from the terminal edge of the guide flange as at $x$ in FIG. 3.

By this bearing construction, the bearing assembly can effectively withstand radial as well as axial loads and has an axial load capacity up to 40 percent of its radial load capacity. Moreover, as noted previously the specific arrangement minimizes the tendency of the rollers of misalign or skew and by reason of the roller contact at the base of the load-bearing flange, the bearing operates at low friction thus reducing the demand on lubricant and the tendency of the roller end face and flange load surface to weld, smear, pull or scuff. Additionally, as noted previously, the area of contact between the roller end faces and the load-bearing flange is such that even under maximum conditions of roller skewing, the terminal edge of the flange does not cut into the sphered roller end face. Additionally the specific arrangement insures a better hydrodynamic lubricant action resulting in less contact friction.

There is shown in FIG. 2 another form of rolling bearing assembly 100 in accordance with the present invention mounted on the journal 112 of a railway car axle. In the present instance, the bearing assembly 100 comprises a pair of inner rings 124 mounted on the journal between a collar 116 at the juncture of the axle 114 and journal 112 and a cap or end disc 120 supported on the free end of the journal 114 by means of screws 122.

Each inner ring has a pair of annular flanges 125 and 127 defining a raceway for the rollers 129 and opposing or confronting load-bearing surfaces 130, 132 against which the axial end faces of the rollers abut. The bearing assembly further includes an outer ring 140 provided with a central depending annular flange 142 separating the outer raceways. Each row of rollers has a cage 150 for circumferentially spacing and guiding the rollers in the annular space between the rings. In the present instance the flange 142 is of a width no greater than the total width of the two narrower abutting flanges of the inner rings thereby to afford a degree of axial play in the bearing assembly. By this arrangement the rollers (and axle) may be axially displaced relative to the outer ring a distance corresponding to the difference between the width of the flange 142 and the spacing of the spaces 132, or in the present instance, twice the difference between the widths of the flanges 124 and 124a respectively.

As in the previously described embodiment, the bearing assembly is characterized by novel features of construction and arrangement whereby the assembly is able to withstand effectively radial and axial loads over an extended period of use. More specifically it has been found that for a particular bearing configuration, optimum radial and axial load-bearing characteristics and fatigue life are provided by a particular bearing configuration wherein the annular load-bearing surfaces are tapered outwardly at an angle $\theta$ relative to a plane P which is transverse to the rotational axis of the rollers, the angle $\theta$ being approximately equal to the following equation:

$$\theta = 1.73 L^{0.778} Z^{-0.25} D^{-0.93}$$

where L is the length of the roller, Z is the number of rollers and D is the roller diameter and wherein the radius R of the sphered end face of the roller is approximately equal to the ratio of 0.417D to the sin $\theta$ and wherein the radial dimension $h$ of the load-bearing flange is at least equal to 0.25D.

In the particular bearing assembly illustrated in FIG. 2, the load-bearing surfaces 130 and 132 are tapered or disposed at the angle $\theta$ and the opposed axial faces 143 of the flange 142 are tapered or disposed at the angle $\theta$ and the radial projections of the flanges 125, 127 and 142 are preferably approximately equal to 0.25D. By this arrangement the sphered end faces of the roller engage the load-bearing surfaces at a point $x$, a radial distance approximately two-thirds below the terminal edge of the load-bearing surfaces. (See FIG. 3.)

The advantages of the specific bearing construction are noted above and briefly include greater radial and axial load capacities, less tendency of the rollers to misalign or skew, lower friction during operation, better lubrication of the elements of the bearing assembly and increased fatigue life.

While particular embodiments of the present invention have been illustrated and described herein, it is to be understood that changes and modifications may be made therein within the scope of the following claims.

I claim:
1. A cylindrical roller bearing assembly comprising inner and outer rings which are spaced apart to define therebetween an annular space, at least a portion of the confronting surfaces of said rings defining inner and outer raceways, at least one row of rollers in said annular space, means defining an annular load-bearing surface on opposite sides of said row of rollers projecting radially relative to said raceways and against which the axial end faces of the rollers are adapted to abut, each said load-bearing surface being disposed at an angle $\theta$ relative to a plane transverse to the rotational axis of the rollers approximately equal to the product of $1.73L^{.778}Z^{-0.25}D^{-0.93}$, where L is the roller length, Z is the number of rollers and D is the diameter of a roller, the axial end face of each of said rollers confronting the load-bearing surfaces being sphered, the radius of curvature of which is approximately equal to the ratio of 0.417D to the sin $\theta$, whereby the sphered roller end faces are adapted to engage the angled load bearing surfaces between the midpoint thereof and a projected surface of revolution of the raceway and wherein the conformity of the roller end faces and the load bearing surfaces at the contact zones is such to promote a hydrodynamic action of a lubricant in these zones.

2. A cylindrical roller bearing assembly as claimed in claim 1 wherein the radial projection of said load-bearing surface from said raceway is approximately equal to 0.25D.

3. A double row cylindrical roller bearing assembly comprising inner and outer rings which are spaced apart to define therebetween an annular space, said outer ring having a radially inwardly projecting annular rib dividing the outer ring into a pair of outer raceways, two rows of rollers in said annular space on opposite sides of said rib, opposite sides of said rib providing load-bearing surfaces against which the end faces of the rollers engage, a pair of collars at opposite ends of said inner ring having portions which project radially outwardly beyond the inner raceway to define load-bearing surfaces against which the end faces of the rollers in each row abut, said load-bearing surfaces being disposed at an angle $\theta$ relative to a plane transverse to the rotational axis of the rollers approximately equal to the product of $$1.73L^{.778}Z^{-0.25}D^{-0.93}$$

where L is the roller length, Z is the number of rollers and D is the diameter of a roller, the axial end face of each of said rollers confronting the load-bearing surfaces being sphered, the radius of curvature of which is approximately equal to the ratio of 0.417D to the sin $\theta$, and the radial projection of said load-bearing surfaces from their respective raceways being approximately equal to 0.25D, whereby the sphered roller end faces are adapted to engage the angled load bearing surfaces between the midpoint thereof and a projected surface of revolution of the raceway and wherein the conformity of the roller end faces and the load bearing surfaces at the contact zones is such to promote a hydrodynamic action of a lubricant in these zones.

4. A double row cylindrical roller bearing assembly comprising an outer ring common to both rows of rollers having a central radially inwardly projecting flange between the rows of rollers and a pair of inner rings opposed to said outer ring for each row of rollers, said inner rings being mounted in endwise abutting relation intermediate said central flange, each of said inner rings having flanges at each end of the rollers defining annular load-bearing faces for guiding the rollers, the spacing between said load-bearing faces and the adjacent ends of at least one of the inner rings being different, said one inner ring being transposable with respect to said common ring to provide different spacing between the adjacent load-bearing faces of the abutting inner rings, the width of the central guide flange of the outer ring being no greater than the smallest spacing between adjacent load-bearing faces, each of said load-bearing faces being disposed at an angle $\theta$ relative to a plane transverse to the rotational axis of the rollers approximately equal to the product of $$1.73L^{.778}Z^{-0.25}D^{-0.93}$$

where L is the roller length, Z is the number of rollers and D is the diameter of a roller, the axial end face of each of said rollers confronting the load-bearing surfaces being sphered, the radius of curvature of which is approximately equal to the ratio of 0.417D to the sin $\theta$, and the radial projection of said guide surface from said raceway being approximately equal to 0.25D, whereby the sphered roller end faces are adapted to engage the angled load bearing surfaces between the midpoint thereof and a projected surface of revolution of the raceway and wherein the conformity of the roller end faces and the load bearing surfaces at the contact zones is such to promote a hydrodynamic action of a lubricant in these zones.

References Cited by the Examiner
UNITED STATES PATENTS
2,962,328   11/1960   Benktander _____ 308—180
FOREIGN PATENTS
106,843   7/1922   Switzerland.

DAVID J. WILLIAMOWSKY, *Primary Examiner.*

FRANK SUSKO, *Examiner.*